United States Patent [19]

Zentner et al.

[11] Patent Number: 5,058,929
[45] Date of Patent: Oct. 22, 1991

[54] MECHANIZED FLUID CONNECTOR AND ASSEMBLY TOOL SYSTEM WITH BALL DETENTS

[75] Inventors: Ronald C. Zentner, Bellevue; Steven A. Smith, Enumclaw, both of Wash.

[73] Assignee: The United States of America as represeted by the Administrator of the National Aeronautics and Space Administration, Washington, D.C.

[21] Appl. No.: 433,881

[22] Filed: Nov. 9, 1989

[51] Int. Cl.[5] .......................................... F16L 15/00
[52] U.S. Cl. ..................................... 285/39; 285/353; 285/23; 285/912
[58] Field of Search ................... 285/23, 39, 353, 384, 285/332.2, 379, 912, 310, 315, 316; 81/57.14; 166/77.5, 85, 338, 339, 340; 403/1, 24, 166, 245, 314, 320, 325, 359

[56] References Cited

U.S. PATENT DOCUMENTS

| | | | |
|---|---|---|---|
| 2,400,712 | 5/1946 | Prather et al. | 81/57 |
| 2,795,985 | 6/1957 | Wilson | 81/57 |
| 2,907,242 | 10/1959 | Chakroff | 81/57 |
| 2,952,177 | 9/1960 | Skillin | 81/54 |
| 3,138,393 | 6/1964 | Livingston | 403/325 X |
| 3,239,245 | 3/1966 | Press ete al. | 285/18 |
| 3,290,063 | 12/1966 | Haeber | 285/18 |
| 3,668,949 | 6/1972 | Walker | 81/57.13 |
| 4,198,080 | 4/1980 | Carpenter | 403/325 X |
| 4,402,533 | 9/1983 | Ortloff | 285/912 X |
| 4,616,952 | 10/1986 | Schott | 403/325 X |

FOREIGN PATENT DOCUMENTS

| | | | |
|---|---|---|---|
| 0688061 | 8/1930 | France | 285/39 |
| 1113575 | 3/1956 | France | 285/39 |
| 0175064 | 4/1961 | Sweden | 403/325 |
| 0707988 | 4/1954 | United Kingdom | 285/39 |
| 1041499 | 9/1966 | United Kingdom | 285/912 |

Primary Examiner—Dave W. Arola
Assistant Examiner—Tim Aberle
Attorney, Agent, or Firm—Edward K. Fein; Harold W. Adams; Russell E. Schlorff

[57] ABSTRACT

A fluid connector system including a modified plumbing union having a rotatable member for drawing said union into a fluid tight condition. A drive tool is electric motor actuated and includes a reduction gear train providing an output gear engaging an integral peripheral spur gear on the rotatable member. A housing member attached to the connector assembly provides coaxial alignment for an interface socket on the drive tool. A hand lever actuated latching system includes a plurality of circumferentially spaced latching balls selectively wedged against the housing member attached to the connector assembly or to secure the drive tool to the connector assembly with its output gear in mesh with the integral peripheral spur gear. The drive motor is torque, spped and direction controllable.

10 Claims, 4 Drawing Sheets

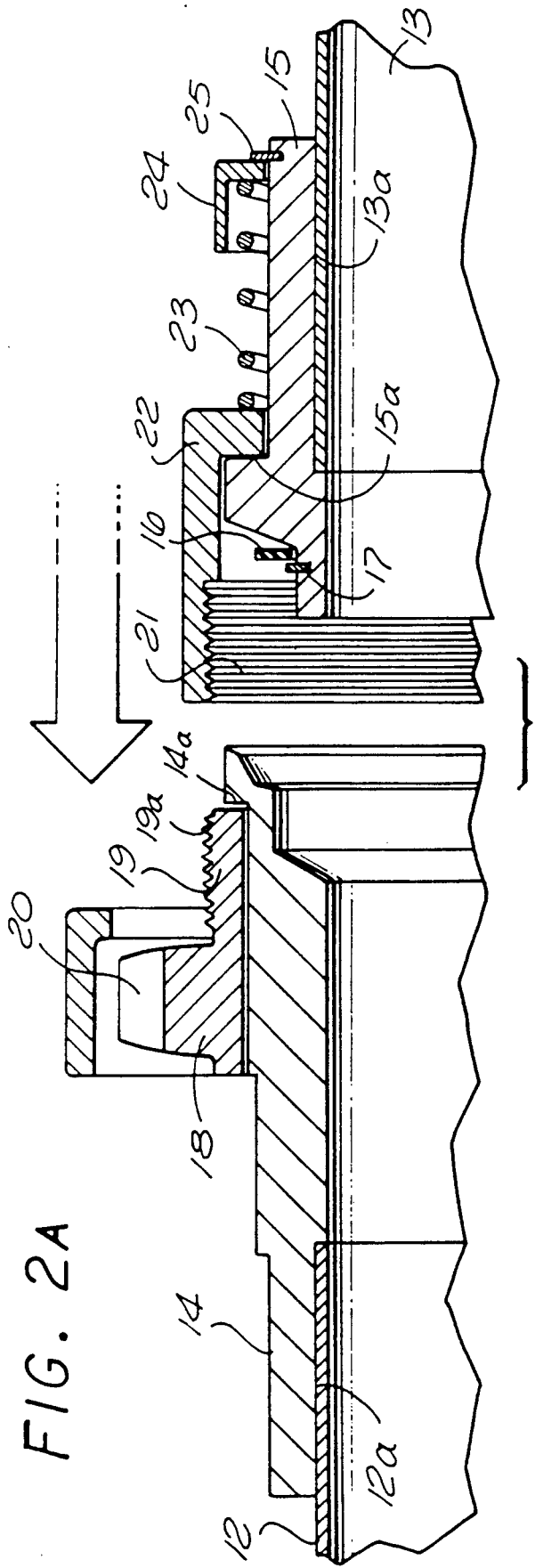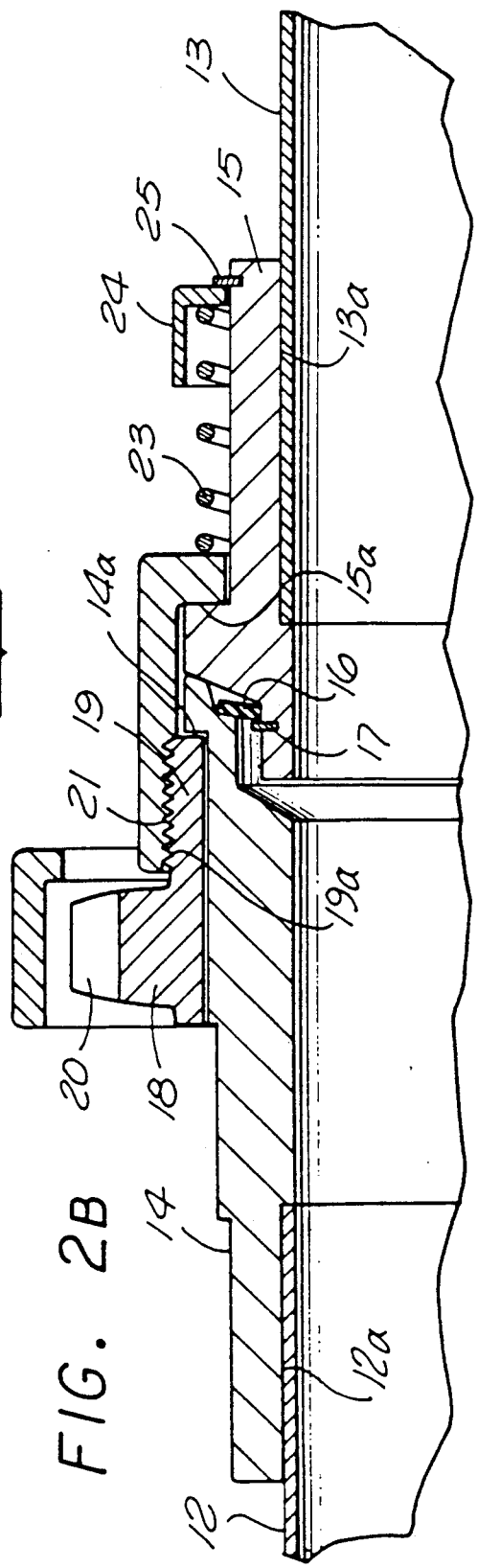
FIG. 2A
FIG. 2B

MECHANIZED FLUID CONNECTOR AND ASSEMBLY TOOL SYSTEM WITH BALL DETENTS

ORIGIN OF THE INVENTION

The invention hereinafter described was made in performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

In the art relating to. fluid couplings for pipe or tubing, the so-called plumbing "union" has been employed for many years. Ordinarily two mating parts of a union are drawn together in a fluid-tight manner by rotating an internally threaded coupling member captive with respect to one pipe or tubing member over a correspondingly externally threaded ferrule attached to another pipe or tubing member. Usually this operation requires two-handed operation and the use of a wrench requiring substantial clearances about the coupling. Such limitations are serious obstacles where the connection of fluid lines must be accomplished by an astronaut in space, assembling a space station, for example.

The size of a space station active thermal control system precludes ground assembly of all piping unions and as many as 50 to 250 fluid connections must be assembled in orbit by Astronauts outside of their pressurized space vehicle in the performance of extravehicular activity (EVA), and/or telerobotic devices. Fluid lines in that application may range in size from approximately 1 centimeter to 7 centimeters in diameter and, particularly the larger sizes require large torques for proper assembly.

The field of the invention may be summarized as automated pipe segment assembly systems employing plumbing unions, particularly in space stations where conventional assembly techniques are unacceptably burdensome for the EVA astronauts required to perform the task.

2. Background Art

Power wrenches for various applications have been developed in the mechanical arts and are described in the patent literature. Pertinent background patents known to the originators of the present invention comprise U.S. Pat. Nos. 2,795,985; 2,907,242; 2,952,177; 3,290,063; 3,239,245 and 3,668,949.

U.S. Pat. No. 2,795,985 discloses a plumbing joint of the spigot and socket joint type. A resilient compressed as a threaded head member is rotated in communication with socket member threads to compress a resilient gasket forming a seal. The head member has a gear toothed periphery which acts as a ring gear. A pinion gear on a shaft engages this ring gear. Rotation of the shaft by means of a wrench or the like provides substantial mechanical advantage but, in the space station environment, offers no assembly advantage. In fact, its operation would be quite burdensome for an astronaut in that critical hand tool alignment would be required.

In U.S. Pat. No. 2,907,242 a plumbing union type of pipe coupling is shown. An annular gear is engaged by a pinion gear on a shaft extending normally with respect to the coupled pipe. The orientation of this shaft provides more convenient tool interface where a plurality of pipe joints may be in lateral juxtaposition, as in a duct or trough, but in the space station application the use of this device would be burdensome to the astronaut assembling a piping system in space.

U.S. Pat. No. 2,952,177 discloses a power wrench apparatus for operating a chuck or the like and as such has only very limited relevance to the novel combination of the present invention.

U.S. Pat. No. 3,290,063 describes a power-operated pipe coupling including a rack and pinion gearing arrangement for applying compression between interfaced pipe segment ends, but does not afford relief from tool alignment and operation inconvenience.

U S. Pat. No. 3,239,245 employs a plumbing union with a gear toothed periphery on its rotatable member. A worm gear on a shaft tangential to the rotatable member periphery provides mechanical advantage, but does nothing to enhance tool alignment or operator ease.

The concept of a power wrench for operating the rotatable member of a pipe coupling device is shown in U.S. Pat. No. 3,668,949, particularly in an underwater situation. Required positioning of the power wrench in respect to a shaft is not sufficiently convenient to be applicable to the space station environment. The disclosure of U.S. Pat. No. 3,668,949 contemplates a power wrench device having an output worm gear. Means are provided for positioning this worm gear to drive a spur gear mounted on a shaft. Rotation of this shaft effects rotation of undisclosed elements pertinent to underwater pipe connection. That combination is said to apply particularly to oil and gas wellhead connections under water. The structure would not be sufficiently convenient for the space station application. None of the prior art references show the particularly advantageous device of the present invention and no combination of the references could produce the device of the present invention by exercise of ordinary skill.

SUMMARY OF THE INVENTION

In consideration of the state of the most relevant prior art, it may be said to have been the general objective of the invention to produce a versatile fluid connector and powered assembly tool which is easily operable using one hand. Novel, self-aligning structure is included for quick and accurate attachment and removal of the assembly tool from a modified plumbing "union" employed to effect joining of pipe segments.

The plumbing union may be conventionally attached to the respective pipe segments to be joined in a fluid-tight relationship. As in a prior art plumbing union, a rotatable threaded member working against a threaded ferrule draws the pipe segment interfaces together. Additional structure provided in the pipe connector assembly includes a gear toothed periphery on the rotatable member (annular retainer) and a drive tool interface housing in a generally cylindrical shell shape extending laterally from the connector assembly. The gear toothed periphery of the rotatable member is visible within the connector assembly interface housing.

The drive tool (mechanized connector operator) comprises an electric motor controllable as to speed, torque and direction of rotation. A reduction gear train connected to the motor provides an output gear which meshes with the aforementioned toothed periphery of the rotatable member when the drive tool assembly is mated therewith. To facilitate such mating, the drive tool output gear is visible within an interface socket integral with the drive tool housing. This interface socket fits coaxially over the connector assembly interface housing. An outer sleeve over the interface socket is axially translatable in response to a hand operated control handle. This outer sleeve has a reducing inside diameter measured from its lower end causing a plurality of circumferentially spaced alignment (locking) balls to be forced into detent recesses in the cylindrical outer surface of the drive tool interface part when the outer sleeve is lowered to force these balls into those detent recesses. The balls are captive within the concentric inner structure of the drive tool interface housing and are allowed to disengage from the detent recesses when the outer sleeve is lifted to align its larger inside diameter opposite the balls to release the drive tool from attachment to the connector assembly.

A free play clutch within the drive tool assembly permits a small amount of angular freedom as the drive tool is mated to the connector assembly to effect alignment of the balls with the aforementioned detent recesses.

A compression spring biases the rotatable member of the connector assembly toward the opposite threaded member to ensure its automatic engagement with the opposite threads within the plumbing union structure of the connector assembly.

The details of the manner in which the combination of the invention is constructed in preferred form will be evident as this description proceeds.

BRIEF DESCRIPTION OF THE DRAWINGS

FIG. 2A is a detail of the connector assembly union poised for mating consistent with FIG. 1.

FIG. 2B is a detail of the connector assembly union after mating has been accomplished.

DETAILED DESCRIPTION OF THE PREFERRED EMBODIMENT

Figure 1:
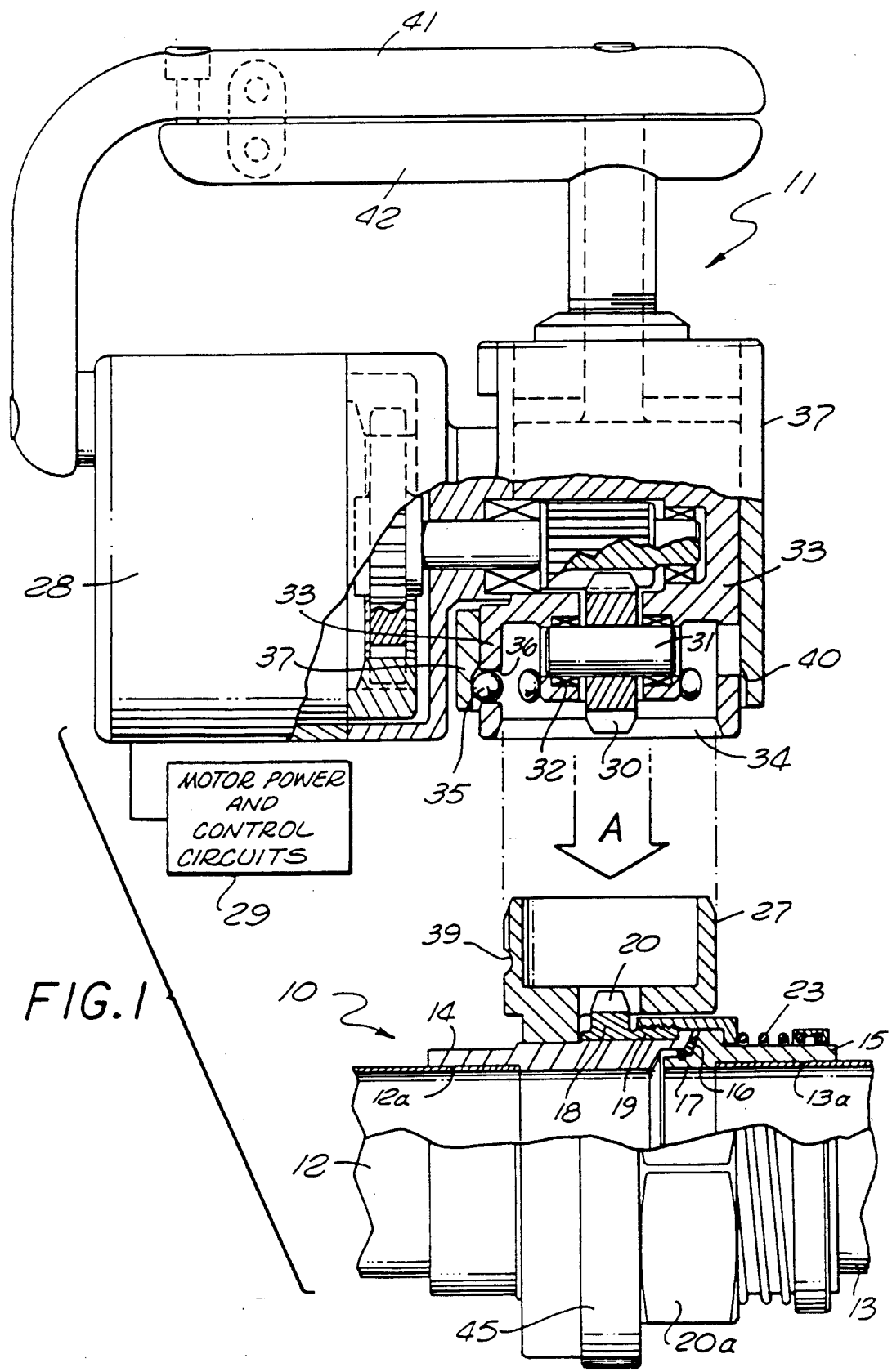
FIG. 1 is a partially sectioned view of the connector assembly and drive tool positioned for attachment to the connector assembly.

Referring now to FIG. 1, a partially sectioned fluid connector assembly 10 according to the invention is shown in the assembled (mated) condition. A mechanized drive tool 11 is depicted poised to be mated to the connector 10 assembly in the direction of arrow A.

The connector assembly 10 will be seen to be a plumbing "union", as that term is understood in the art, with additional structure adapting it for interface with the drive tool 11 to either assemble or disassemble the union interface.

In FIG. 1, pipe or tubing sections 12 and 13 to be functionally joined for fluid continuity are shown. These tubing sections 12 and 13 are rigidly joined within axial bores 12a and 13a formed in sleeves 14 and 15 respectively, by a known method such as swaging, sweat solderinq or some other technique suitable for the environmental conditions to which the connector assembly will be subjected.

In describing the connector assembly 10, it will be helpful to also refer to more detailed FIG. 2A and FIG. 2B, which provide enlarged sectional views of the joining of sleeve parts 14 and 15 to effect fluid-tight continuity between pipe sections 12 and 13. The inwardly facing surfaces of sleeves 14 and 15 are shaped as indicated in FIG. 2A and rest together when the connector halves are mated as shown in FIG. 2B. A fluid-tight connection is provided by a seal 16 and a retainer ring 17. This combination is extant in the prior art and has been incorporated in "union" assemblies which are standard items of commerce.

An annular retainer 18 having an axially extending portion 19 and perimeter or peripheral gear teeth 20 will be seen in FIGS. 1, 2A and 2B. This retainer, 18 is free to rotate about sleeve 14, but not to translate axially. A shoulder 14a on sleeve 14 provides this constraint. Axially extending portion [19 has external threads 19a which, when retainer 18 is rotated, engage the internal threads 21 seen on a ferrule 22 which is slidably mounted over sleeve 15. Ferrule 22 is biased against shoulder 15a of sleeve 15 by compression spring 23 to bear against the shoulder 15a with sufficient force to restrain the ferrule 22 from substantial rotation about the sleeve 15 and to keep the ferrule 22 advanced for automatic thread mating between the axially extending portion 19 and the ferrule 22. A keeper 24 is held in place axially by retainer ring 25 to anchor spring 23 on its right end as viewed on FIG. 2A or 2B.

The sole moving part in the fluid connector assembly 10 is the axially extending portion 19 in response to rotational drive applied to the perimeter gear teeth 20 for engagement or disengagement. Fully engaged, the mated ferrule 22 and axially extending portion 19 bear against shoulders 15a and 14a to secure the assembly in fluid-tight mode.

Referring again to FIG. 1, a drive tool interface housing member 27 of circular shell form is shown attached to the sleeve 14. This housing member 27 is undercut on its right side (as depicted in FIG.

1) to accommodate the engagement of threads 19a and 21. The perimeter gear teeth 20 project minimally upward into the interior of housing 27. The drive tool assembly 11 comprises an electric motor 28 and a conventional power source and control circuitry 29 for controlling the motor 28 speed, torque and forward/reverse modes. This motor 28 includes integral speed reduction gearing and an integral free-play clutch to facilitate initial gear meshing between the perimeter gear teeth 20 and the spur gear teeth 30 when the connector assembly 10 is mated to the drive tool assembly 11.

Figure 3:
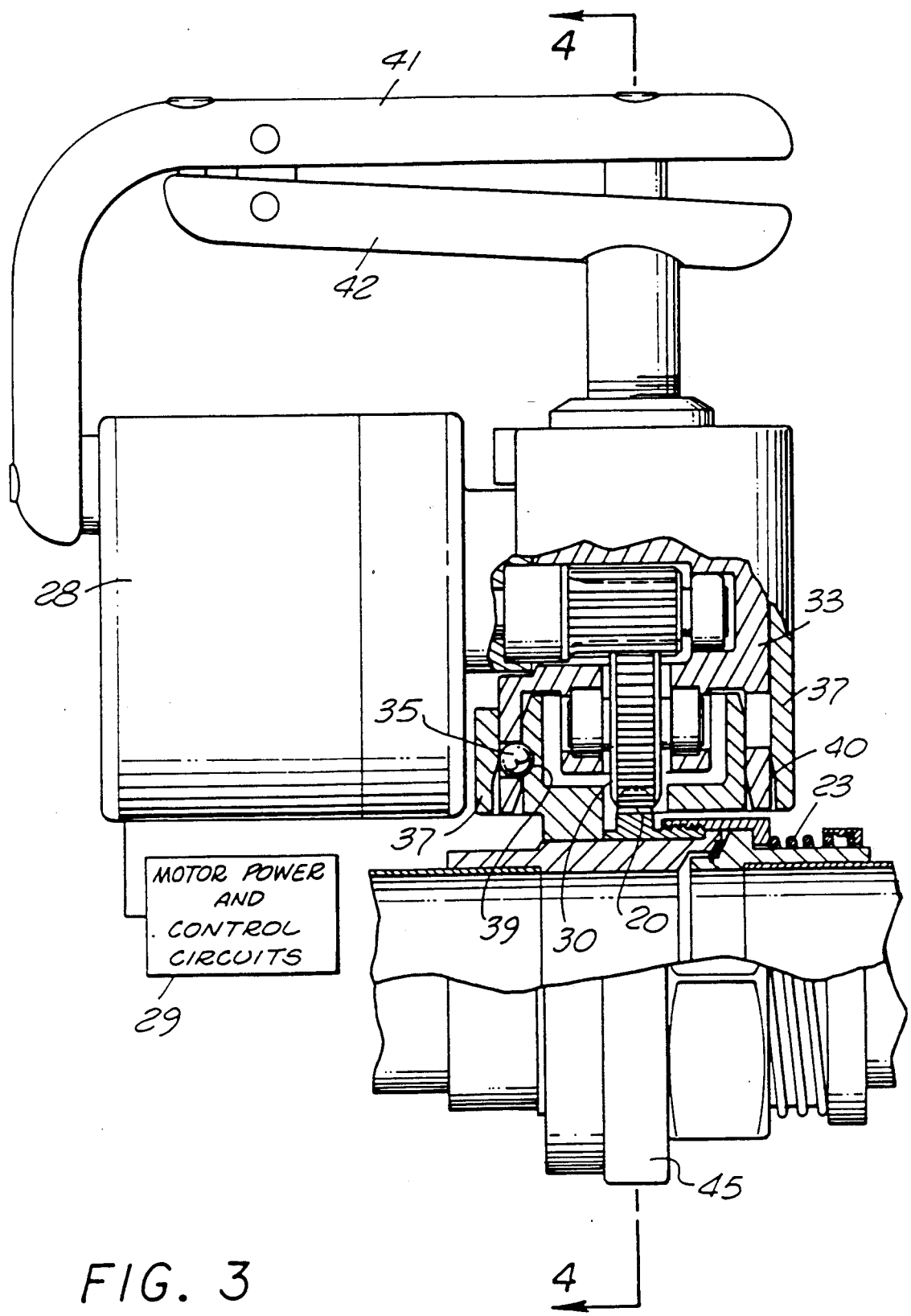
FIG. 3 is a partially sectioned view of the FIG. elements of the connector assembly and drive tool assembly mated together.

In the drive tool 11, the spur gear 30 is mounted on a shaft 31 supported by bearings pressed into a spindle structure 33. This spindle structure 33 is attached to the drive motor housing. The spindle structure 33 forms the center of a member which serves as a drive interface socket 34 and the socket volume surrounds it. The drive interface socket 34 moreover defines the socket volume and fluid connection interface housing member 27 fits coaxially within the downward projecting spindle structure 33. A plurality of circumferentially spaced detent balls 35 are seated in clearance holes 36 bored laterally through the wall of spindle structure 33. These balls 35 are loosely fitted into the clearance holes 36. A coaxial sleeve 37 is lifted to the position shown in FIG. 1 when actuator handle halves 41 and 42 are squeezed together and the entire drive tool assembly 11 can then be rotated about the centerline of the interface socket 34 as well as being responsive to effect mating axially with the interface housing member 27. Once this mating has occurred, the handle halves 41 and 42 are released and the compression spring 38 causes the structure connected with coaxial sleeve 37 to be urged downward (see FIG. 1) opening the handle halves 41 and 42 as depicted in FIG. 3. The balls 35 are caused to seat each in a corresponding indentation 39. The downward motion of sleeve 37 jams the balls 35 radially inward because of a chamfered counterbore 40 in the sleeve 37 thereby locking the drive tool into the fluid connector assembly 10. Actuation of the drive motor 28 now can effect coupling or decoupling of the connector assembly 10.

Figure 4:
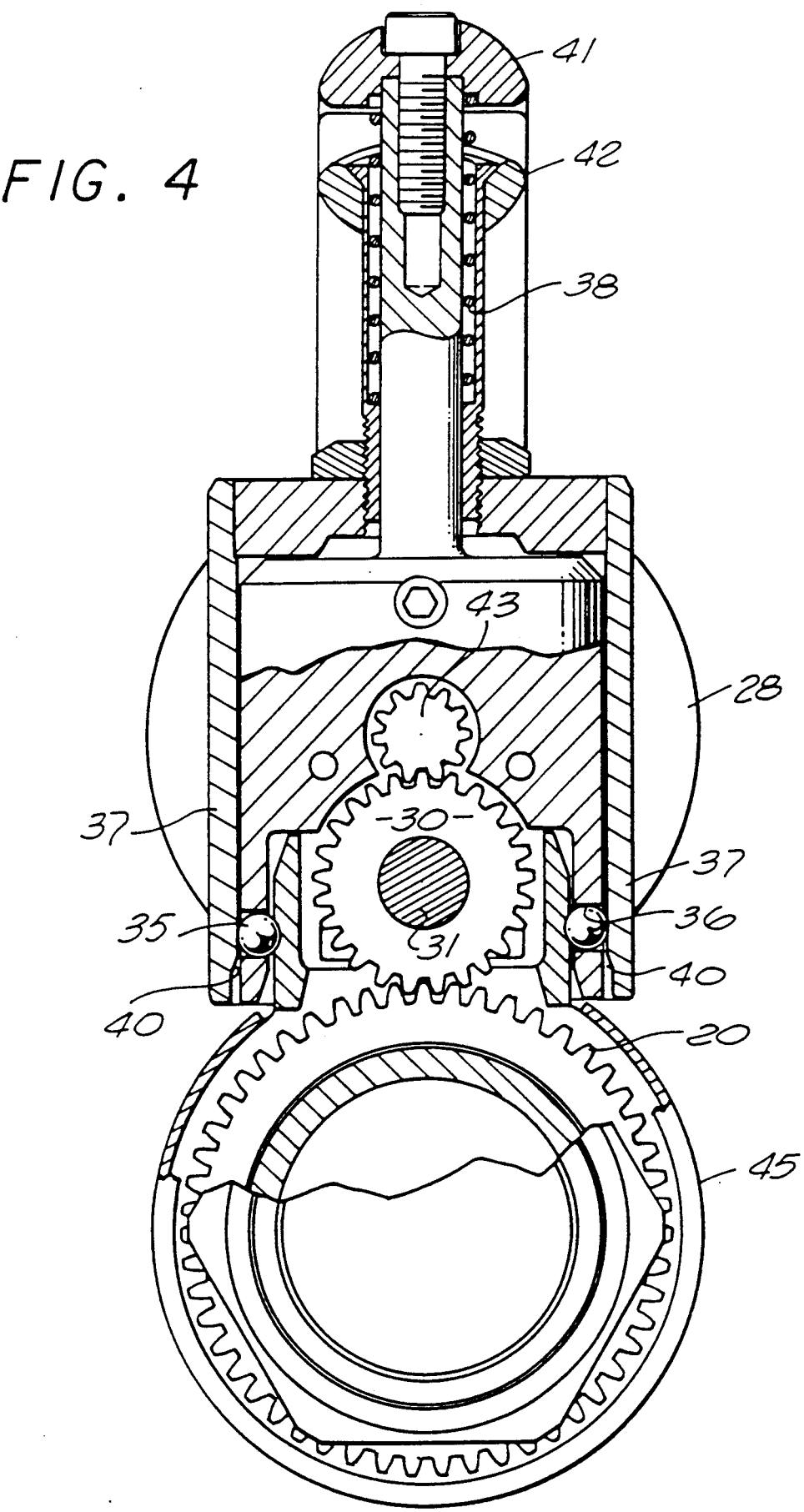
FIG. 4 is a view consistent with FIG. 3 further sectioned as indicated on FIG. 3.

The sectional view of FIG. 4 taken as indicated in FIG. 3 shows the gearing mechanism more clearly. Element identifications serve to correlate FIG. 4 with FIGS. 2 and 3. The first gear on the motor shaft 43 and intermediate gear 30 result in a reduction of rotation speed for thread engagement of threads 19a and 21, (FIG. 1). A perimeter gear cover 45 is evident in FIG. 4 as well as in FIGS. 1 and 3.

A typical angular velocity of gear 30 would be on the order of 12 RPM and a typical maximum torque available there would be on the order of 450 to 700 kilogram centimeters. The free play of the clutch in the motor 28 is provided as a commercially available feature and produces an angular free travel on the order of 30 degrees measured at gear 30. A typical drive motor 28 may be type 3 manufactured by Schaffer Magnetics Inc. of Chatsworth, Calif. That drive motor or actuator as it may be called, also provides reversibility and impact operation under control of circuits 29.

The fluid connector assembly 10 may be an assembly of metallic parts fitting the description set forth in the foregoing or could be an assembly of plastic parts depending on the requirements imposed by the application. In a space vehicle application, known light weight but strong metal is assumed to be employed to join metallic pipes 12 and 13.

OPERATION

A typical procedure for employment of the assembly tool with a fluid connector having the modifications and additional structure described involves the steps of:

Hand actuating (squeezing closed) the drive tool handle grip halves 41 and 42 to the position shown in FIG. 1; placing the drive interface socket 34 of the connector assembly 10 over the interface housing 27 on fluid connector assembly 10; rotating the drive tool assembly to seat latch balls 35 in corresponding detents 39; releasing the handle grip halves 41 and 42 to permit latching between connector operator and fluid connector assembly as described hereinbefore; energizing the drive motor 28 from the circuits 29 to couple or decouple the fluid connector as required. Removal of connector operator is effected by again actuating (squeezing closed) handle halves 41 and 42 and withdrawing the tool assembly.

It will be noted that the operator (astronaut or other) can accomplish these steps with one hand and all reaction forces are self contained. That is, the reaction torque is resisted by the structure of the fluid connector itself.

It will be realized that the invention is applicable to various, non-space applications where fluid line connections are close together or are in narrow or confined places.

While a preferred embodiment particularly adapted for space assembly of fluid lines in a space station or the like, it will be realized that other applications are possible. For one example, multiple adjacent fluid connectors in a confined space can be assembled or disassembled without the clearance requirement imposed by use of standard hand tools (wrenches, etc.).

In view of the versatility of the combination of the invention, variations will suggest themselves to those of skill in this cut from the teachings herein. Accordingly, it is intended that the scope of the invention be limited only by the claims following.

We claim:

1. A fluid pipe connector system comprising:
   a connector assembly including a plumbing union having first and second members connected to a corresponding first and second pipe segments to be joined in a fluid-tight relationship, said union having a rotatable member arranged to draw said first and second members together in a fluid-tight relationship;
   a peripheral gear integral with the perimeter of said rotatable member;
   a one-hand operated drive tool comprising an electric motor and a gear reduction train associated with said motor, said gear train providing an output gear meshable with said peripheral gear;
   hand operated latching means associated with said drive tool for selectively connecting said drive tool to said connector assembly and disconnecting said drive tool from said connector assembly, and, while connected, for maintaining said drive tool output gear into mesh with said peripheral gear, wherein said latching means comprises a plurality of circumferentially spaced balls axially constrained within the structure of said drive tool, but free to assume radially varying positions, an interface housing member of circular shell form extending from said first pipe segment of said connector assembly, a socket member attached to said drive tool structure and coaxial with said interface housing member, said interface housing member fitting within said socket member when said drive tool is mated to said connector assembly, and hand operated means for forcing said balls radially inward against said interface housing member to align and retain said drive tool with its output gear meshed with said connector assembly peripheral gear; and
   means for energizing said drive tool to rotate said output gear and therefore to rotate said rotatable member.

2. The combination according to claim 1 in which said hand operated means comprises an outer sleeve having a first inside diameter, said sleeve axially slidable over said socket member, said sleeve also having a second decreased inside diameter measured upward from its lower end, whereby said sleeve operates to exert radially inward pressure against said balls to bear against said interface housing member in a locking relationship when said outer sleeve is lowered to bring said decreased inside diameter opposite said balls.

3. The combination according to claim 2 in which a plurality of detent recesses is provided along the surface of said interface housing member, said recesses having circumferential spacing matching the spacing of said balls thereby to latch said drive tool in place at an angle ensuring meshing of said drive output gear and said connector assembly peripheral gear.

4. The combination set forth in claim 3 in which said drive motor and reduction gear train is of the free play clutch design so as to facilitate initial meshing of said drive tool output gear and said connector assembly peripheral gear.

5. The apparatus set forth in claim 4 in which said second inside diameter of said outer sleeve is sufficient to permit said latching balls to move radially outward from said first alignment means to release the latching effect and permit withdrawal of said drive tool.

6. The apparatus set forth in claim 5 in which a second spring is emplaced to bias said outer sleeve to place said outer sleeve second inside diameter opposite said balls when said hand operated means is not operated.

7. The apparatus as set forth in claim 4 wherein said rotation member is associated with one of said pipe segments to be joined, further including a ferrule associated with the other of said pipe segments, said ferrule matable with said rotatable member, and a first compression spring located to bias said ferrule forward toward said rotatable member to ensure engagement upon rotation of said rotatable member.

8. The apparatus set forth in claim 7 in which a second spring is emplaced to bias said outer sleeve to place said outer sleeve second inside diameter opposite said balls when said hand operated means is not operated.

9. In a pipe connector system in which pipe joinder is effected by a plumbing union having a rotatable member for drawing two pipes into a fluid tight condition, the combination comprising:

first means within said plumbing union including a peripheral gear integral with said rotatable member;

second means including a one-hand operated drive tool having an electric actuator motor, a reduction gear train and an output gear;

first alignment means including a structure for holding said output gear in mesh in a plane with said peripheral gear on said rotatable member, said alignment means comprising a cylindrical shell member attached to a fixed portion of the structure of said pipe connector system and extending normally and radially outward from the longitudinal centerline of said plumbing union;

second alignment means comprising an interface socket integral with the structure of said drive tool, said socket fitting coaxially over said cylindrical shell member;

an outer sleeve slidable over said socket, said sleeve having a first inside diameter to provide a sliding fit over said interface socket member and an enlarged second inside diameter over a predetermined length of said sleeve measured from the end thereof facing said plumbing union;

a plurality of circumferentially spaced latching balls nested in clearance bores through the wall of said socket member and correspondingly circumferentially spaced detent recesses in the outer wall of said first alignment means; and hand operated means associated with said drive tool for selectively sliding said outer sleeve to force said balls into said detent recesses when said outer sleeve first inside diameter is adjacent said balls thereby to latch said drive tool in place.

10. The apparatus as set forth in claim 9 wherein said rotatable member is associated with one of said pipes to be joined, further including a ferrule associated with the other of said pipes, said ferrule matable with said rotatable member, and a first compression spring located to bias said ferrule forward toward said rotatable member to ensure engagement upon rotation of said rotatable member.

* * * * *